US012798499B2

(12) United States Patent
Yamasaki

(10) Patent No.: US 12,798,499 B2
(45) Date of Patent: Nov. 17, 2026

(54) INSTALLATION STRUCTURE OF ELECTRIC WIRES

(71) Applicant: TOYOTA JIDOSHA KABUSHIKI KAISHA, Toyota (JP)

(72) Inventor: Shoji Yamasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 18/941,517

(22) Filed: Nov. 8, 2024

(65) Prior Publication Data

US 2025/0249846 A1 Aug. 7, 2025

(30) Foreign Application Priority Data

Feb. 5, 2024 (JP) ................................ 2024-015866

(51) Int. Cl.

*B60R 16/00* (2006.01)
*B60R 16/02* (2006.01)
*H02G 3/38* (2006.01)

(52) U.S. Cl.

CPC ......... *B60R 16/0215* (2013.01); *H02G 3/383* (2013.01)

(58) Field of Classification Search

CPC ............................ B60R 16/0215; H02G 3/383
USPC ........................................................ 296/208
See application file for complete search history.

(56) References Cited

U.S. PATENT DOCUMENTS

2010/0043225 A1 2/2010 Ojika et al.
2015/0210230 A1 7/2015 Adachi et al.
2022/0161742 A1 5/2022 Saito
2025/0157690 A1* 5/2025 Sano .................... H02G 3/0406

FOREIGN PATENT DOCUMENTS

JP S59-179421 U 11/1984
JP H02-038798 A 2/1990
JP 2010-047031 A 3/2010
JP 2014-093799 A 5/2014
JP 2020-145878 A 9/2020
WO WO-2008038631 A1 * 4/2008 ......... B60R 16/0207

OTHER PUBLICATIONS

Office Action issued in Japanese counterpart application JP 2024-015866 on Jun. 23, 2026.

* cited by examiner

*Primary Examiner* — Steven O Douglas
(74) *Attorney, Agent, or Firm* — SoraIP, Inc.

(57) ABSTRACT

A floor panel constituting a floor surface in a room of a vehicle, an undercover arranged at a predetermined interval on a lower side in a vertical direction of the floor panel, a wire harness arranged with respect to the undercover and transporting electric power, and a connector attached to the wire harness and capable of electrical connection and disconnection, wherein a mounting structure of an electric wire includes a cover member arranged in a direction perpendicular to the undercover and provided so as to cover the connector, and the cover member is fastened so that an inside accommodating the connector is in a liquid-tight state with respect to the undercover.

5 Claims, 3 Drawing Sheets

INSTALLATION STRUCTURE OF ELECTRIC WIRES

CROSS-REFERENCE TO RELATED APPLICATION

This application claims priority to Japanese Patent Application No. 2024-015866 filed on Feb. 5, 2024, incorporated herein by reference in its entirety.

BACKGROUND

1. Technical Field

The present disclosure relates to an installation structure of electric wires including connectors and the like arranged under a floor or the like of a vehicle.

2. Description of Related Art

Japanese Unexamined Patent Application Publication No. 02-38798 (JP 02-38798 A) discloses a protective structure of harnesses, tubes or the like disposed on a lower surface of a floor of a vehicle. In the structure of JP 02-38798 A, a recess is provided on the lower surface of the floor of the vehicle so as to extend in the front-rear direction of the vehicle and to be recessed toward the upper side of the vehicle. The harnesses or tubes are disposed along an upper surface of the recess. A plurality of divided protective covers is fitted in the recess, and the harnesses or the tubes are covered by the protective covers. The protective covers are elongated in the front-rear direction of the vehicle and are formed into a C shape in cross section, and are arranged so that the harnesses or tubes enter a portion opened in the cross section.

Japanese Unexamined Patent Application Publication No. 2014-93799 (JP 2014-93799 A) discloses a wire harness that extends in the front-rear direction and is mounted under the floor of a vehicle. The wire harness of JP 2014-93799 A includes a high-voltage conductive path, an exterior member that houses and protects the high-voltage conductive path, and shield connectors provided on terminals of the high-voltage conductive path. The high-voltage conductive path has a high-voltage circuit constituted of a conductor that is a high-voltage electric wire and an insulator that covers the conductor, a shield member that covers the high-voltage circuit, and a sheath that is provided outside the shield member. The exterior member is a tube body made of resin and covering the high-voltage conductive path. Furthermore, the exterior member includes a flexible tube portion having flexibility and an inflexible tube portion having no flexibility. The flexible tube portion and the inflexible tube portion are molded integrally out of resin. That is, the exterior member of JP 2014-93799 A is formed in a form without any joint or any slit so as to communicate an outer surface and an inner surface of the exterior member with each other. The shield connector covers the high-voltage conductive path and is connected to the terminal portions of the high-voltage conductive path.

Japanese Unexamined Patent Application Publication No. 2010-47031 (JP 2010-47031 A) discloses a method of producing a wire harness mounted on a vehicle for the purposes of improving productivity and wiring workability. The wire harness disclosed in JP 2010-47031 A includes high-voltage electric wires, low-voltage electric wires, a corrugated tube that protects the high-voltage electric wires and the low-voltage electric wires, a protector for fixing the corrugated tube to the vehicle, and a grommet. The grommet is assembled to a through hole provided in a panel of the vehicle body. In the producing method of JP 2010-47031 A, the grommet and the protector are previously assembled to the corrugated tube at a predetermined position. Thereafter, a plurality of high-voltage electric wires and a plurality of low-voltage electric wires are inserted from one end toward the other end of the corrugated tube. Then, terminal fittings are connected to the terminals of the electric wires exposed from one end and the other end of the corrugated tube to provide connectors. The wire harness thus produced is attached to the vehicle by fitting the grommet into the through hole in the vehicle body panel.

SUMMARY

In the structure disclosed in JP 02-38798 A, the harnesses or tubes are disposed in the recess as described above and the protective covers are attached to the recess, which makes it possible to ensure corrosion resistance and the like of the harnesses or the tubes. On the other hand, in the structure of JP 02-38798 A, the protective covers are obtained by division, which may cause moisture intrusion into the recess from the joints among the protective covers. Therefore, when a connector that electrically connects the electric wires or the electric wires and the appliance is provided in the recess described in JP 02-38798 A, there is a possibility that moisture having intruded into the recess reaches the connector.

In an apparatus of JP 2014-93799 A, since the structure has no joint or slit in the exterior member, there is a low possibility that moisture intrudes into the interior of the exterior member. In addition, in the apparatus described in JP 2014-93799 A, a boot is attached to a connector portion which is an end in the longitudinal direction of the exterior member. Therefore, it is possible to suppress moisture from intruding into the connecting portion of the connector. However, when the boot is thus provided, a member for attaching the boot to the exterior member, for example, a tie band, a caulking ring, or the like is required, which causes an increase in the number of components. JP 2010-47031 A discloses a connector provided at an end of a wire harness arranged under a floor of a vehicle, but does not disclose a technique of protecting the connector from moisture. Therefore, there is room for improvement in simplifying the structure and reducing the cost while maintaining the waterproofness of the connector.

The present disclosure provides an installation structure of electric wires capable of simplifying a structure and reducing a cost while maintaining waterproofness of a connector.

A first aspect of the present disclosure provides an installation structure of electric wires including: a floor panel that constitutes a floor surface in a cabin of a vehicle; an undercover that is disposed with a predetermined interval on a lower side in a vertical direction of the floor panel; a wire harness that is arranged with respect to the undercover and transmits electric power; a connector that is attached to the wire harness to enable electrical connection and disconnection; and a cover member that is disposed to face the undercover in the vertical direction and is provided so as to cover the connector, wherein the cover member is fastened to the undercover such that an internal space in which the connector is housed is brought into a liquid-tight state.

In the first aspect, the cover member may further include an electric wire holding rib extending from a surface facing the vertical direction toward the undercover and supporting the wire harness, the undercover may further include another electric wire holding rib extending from a surface facing the vertical direction toward the cover member and supporting the wire harness, the undercover or the cover member may further include a connector holding rib extending upward in the vertical direction from a surface facing the vertical direction and supporting the connector from below.

In the first aspect, a side wall extending in the vertical direction may be provided in at least one of the cover member and the undercover, and an insertion hole through which the wire harness is inserted may be provided in the side wall, and a water cut-off member that fills a gap between the wire harness and the insertion hole may be attached to the insertion hole.

In the first aspect, the cover member may be disposed between the floor panel and the undercover so as to cover the connector from above in the vertical direction.

In the first aspect, the cover member may be disposed on a lower side of the undercover in the vertical direction so as to cover the connector from the lower side in the vertical direction.

According to the installation structure of electric wires of the present disclosure, the undercover and the cover member disposed to face the undercover are provided. The wire harness and the connector attached to the wire harness are disposed between the undercover and the cover member. That is, the connector and a connecting portion of the wire harness to the connector are held by the undercover and the cover member, and are in liquid-tight state with respect to the outside. Therefore, it is not necessary to provide a seal structure on the connector itself, which makes it possible to simplify the configuration of the connector and reduce the force acting on the connector due to vibration or the like.

At least one of the cover member and the undercover has a side wall that covers a surface of the connector facing the horizontal direction. An insertion hole through which the wire harness is inserted is provided in the side wall. A water cut-off member that fills a gap in the insertion hole in a state in which the wire harness is inserted is attached to the insertion hole. Therefore, even if the insertion hole is provided in the side wall, the internal space in which the connector is housed can be brought into a liquid-tight state.

Furthermore, the undercover and the cover member are provided with ribs for holding the wire harness and the connector. Therefore, it is possible to suppress a reduction in the durability of the wire harness and the connector due to contact with the peripheral device and the like resulting from the vibration caused by the vibration of the vehicle. Furthermore, since the wire harness and the connector can be supported by the ribs integrally provided with the undercover and the cover member, it is possible to suppress increases in the number of components and cost. For example, brackets and bolts for fixing the connector directly to the floor panel, or members such as brackets and clamps for supporting the wire harness on the floor panel can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
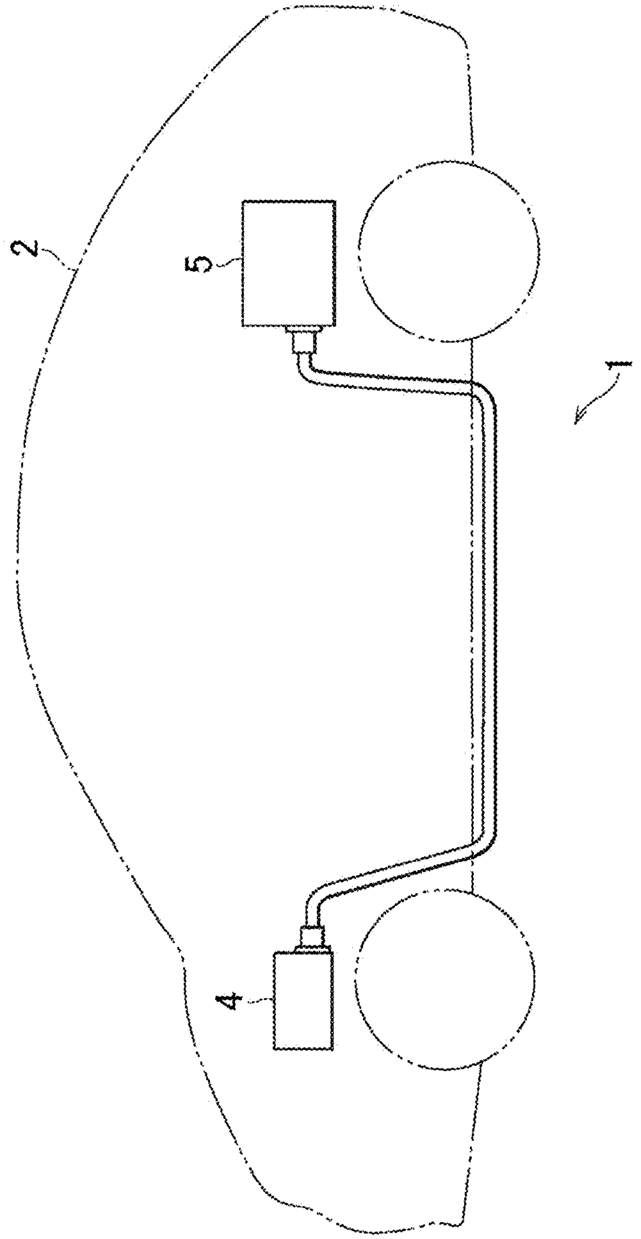
FIG. 1 is a schematic diagram illustrating an example of a vehicle to which an electric wire mounting structure according to an embodiment of the present disclosure is applied.

Hereinafter, the present disclosure will be described based on an embodiment shown in the drawings. Note that the embodiments described below are merely examples of a case where the present disclosure is embodied, and the present disclosure is not limited thereto.

Figure 2:
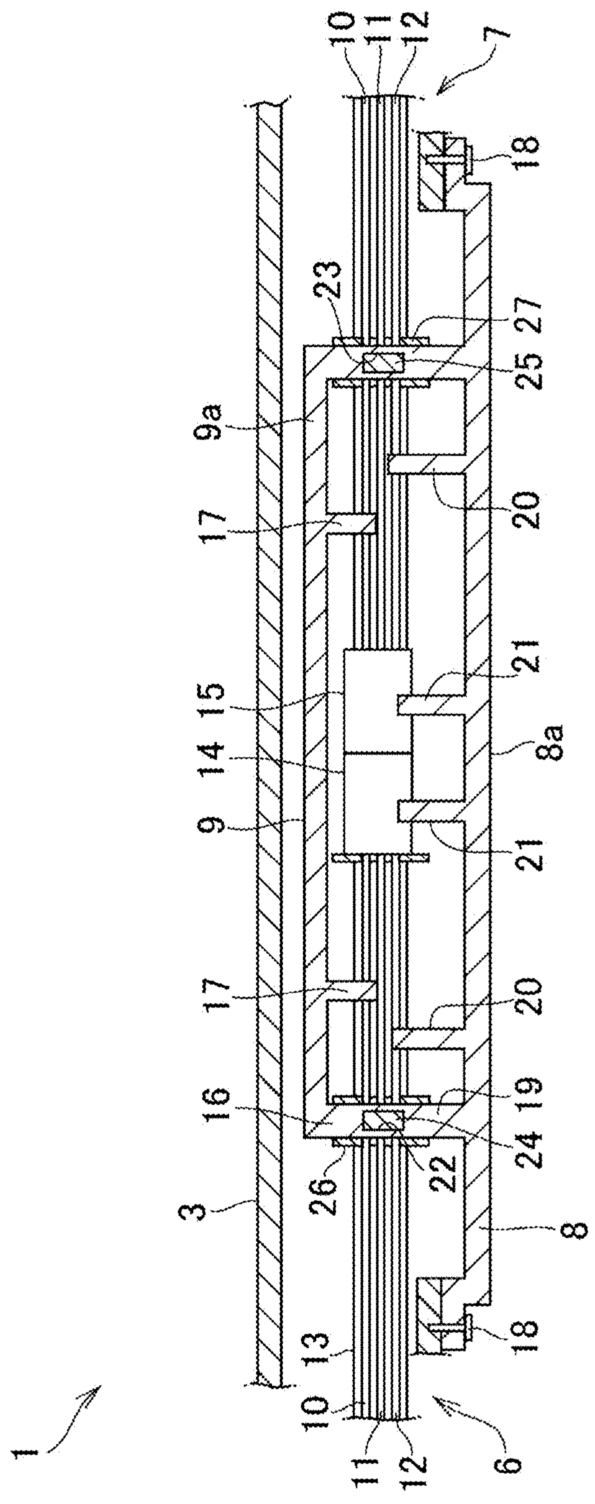
FIG. 2 is a cross-sectional view for explaining an exemplary wire mounting configuration according to an embodiment of the present disclosure.

FIG. 1 shows an example of a vehicle 2 to which an electric wire mounting structure 1 according to an embodiment of the present disclosure is applied. In the mounting structure 1 shown in FIG. 1, a wire harness corresponding to an electric wire is, as shown in FIG. 2, a steel plate formed of a material such as iron, and is wired under the floor panel 3. The floor panel 3 is an example of a floor surface in the embodiment of the present disclosure. In the example illustrated in FIG. 1, the wire harness is an electric wire that electrically connects the motor 4 and the battery 5. That is, the wire harness allows power to be sent or received between the motor 4 and the battery 5. Note that the wire harness may be configured to not only conduct the motor 4 and the battery 5, but also conduct power control units (not shown) and accessories (not shown), and the like. The power control unit includes an inverter and a converter. In the structure shown in FIG. 1, the wire harness extends in the front-rear direction of the vehicle 2 and is routed.

The motor 4 may be constituted by, for example, a three-phase AC synchronous motor in which a permanent magnet is attached to a rotor. Such a motor is similar to a motor provided as a driving force source of a battery electric vehicle or a hybrid electric vehicle. The motor 4 is not limited to such a synchronous motor, and may be an induction motor including a plurality of phases of coils.

FIG. 2 is a cross-sectional view illustrating the mounting structure 1 of the wire harness arranged under the floor of the vehicle 2 as described above. As shown in FIG. 2, the mounting structure 1 according to the embodiment of the present disclosure includes, as main components, a first wire harness 6, a second wire harness 7, an undercover 8, and an upper cover 9.

The first wire harness 6 and the second wire harness 7 are made up of a plurality of electric wires for supplying power to devices including the motor 4, the battery 5, and the like described above, and transmitting electric signals for controlling these devices. Each of the wire harnesses 6 and 7 includes, for example, a high-voltage cable to which a relatively high voltage is applied, which is connected to the above-described motor 4 or the like. In the example illustrated in FIG. 1, each of the wire harnesses 6 and 7 includes, as a high-voltage cable, a first cable 10, a second cable 11, and a third cable 12 that are connected to respective three-phase coils (not illustrated) in the motor 4. Each of the high-voltage cables 10, 11, and 12 is formed of, for example, a core wire through which a current flows, and a coated wire formed so as to cover the surface of the core wire. The core wire is mainly formed of a metal such as copper, and the coated wire is an insulating coating film, for example, is formed of polyethylene or polyimide. Note that each of the wire harnesses 6 and 7 may also include a low-voltage cable (not shown) to which a relatively low voltage is applied, which is connected to an auxiliary device or the like.

In addition, the high-voltage cables 10, 11, and 12 are provided with a shield member (not shown), an exterior cladding tube 13, and the like so as to cover the cladding wire. The shield member is, for example, a member that prevents noise such as electromagnetic waves, and is made of a metal such as aluminum, and is made of a braided wire, a pipe, or the like in which thin metal wires are braided in a mesh shape. The outer-layer cladding tube is a member for protecting each of the high-voltage cables 10, 11, and 12, a low-voltage cable (not shown), a shield member, and the like. A corrugate (corrugated tube) having a braided wire on the inside thereof is used for the exterior cladding tube 13, and may be made of an insulating material such as polypropylene. Note that each of the wire harnesses 6 and 7 may be configured in the same manner as a conventionally known wire harness, and may be, for example, a wire harness as disclosed in JP-A-2014-93799 or the like.

A first connector 14 is attached to an end portion of the first wire harness 6. The first connector 14 is a component that enables electrical connection and disconnection to the second connector 15 attached to the end of the second wire harness 7. The first connector 14 is a connector formed of a male connector (also referred to as a header or a plug). The second connector 15 is a connector made of a female connector (also referred to as a receptive connector or a socket). Therefore, by inserting the first connector 14 into the second connector 15, the first connector 14 and the second connector 15 are electrically connected to each other, and the first wire harness 6 and the second wire harness 7 are electrically connected to each other.

The upper cover 9 is a cover member that is disposed at an interval below the floor panel 3 and attached to the undercover 8. The upper cover 9 is a rectangular member disposed around the first connector 14 and the second connector 15 so as to cover the first wire harness 6 and the second wire harness 7. The upper cover 9 includes a first side wall portion 16 and a first electric wire holding rib 17.

The first side wall portion 16 of the upper cover 9 is a wall surface extending in the vertical direction from the end portion in the horizontal direction on the upper surface **9*a* of the upper cover 9. The first side wall portion 16 is formed so as to surround the first connector 14 and the second connector 15, and is fastened to the undercover 8 in a liquid-tight state. The first side wall portion 16 is formed with a first cutout portion (not shown) for holding the first wire harness 6 and a second cutout portion (not shown) for holding the second wire harness 7. The first cutout portion and the second cutout portion are formed in a U-shaped cross section facing downward in the vertical direction, and are configured so that the first wire harness 6 and the second wire harness 7** can be inserted therethrough, respectively.

On the upper surface **9*a* of the upper cover 9, two first electric wire holding ribs 17 extending vertically downward are formed. Each of the first electric wire holding ribs 17 is provided between the first cutout portion and the first connector 14 in the horizontal direction in the undercover 8, and between the second cutout portion and the second connector 15 in the horizontal direction in the undercover 8. The first electric wire holding rib 17 is formed in a U-shaped cross section facing downward in the vertical direction, similarly to the first cutout portion. When the first wire harness 6 and the second wire harness 7 enter each of the first electric wire holding ribs 17, the respective wire harnesses 6 and 7 are restricted from moving upward or horizontally. The first electric wire holding rib 17** is an example of the wire holding rib in the embodiment of the present disclosure.

The undercover 8 is a resin cover member disposed below the first wire harness 6 and the second wire harness 7. The undercover 8 constitutes the bottom surface of the vehicle 2, and protects the devices and the like disposed on the lower side of the floor panel 3, including the first wire harness 6 and the second wire harness 7. The undercover 8 is fixed to a member (steel plate) that increases the strength of the vehicle body such as a side sill by a bolt 18. The undercover 8 includes a second side wall portion 19, a second electric wire holding rib 20, and a connector holding rib 21.

The second side wall portion 19 of the undercover 8 extends vertically upward from the end portion on the lower surface **8*a* of the undercover 8, and is formed at a position corresponding to the first side wall portion 16 of the upper cover 9. Specifically, the second side wall portion 19 has a third cutout portion (not shown) and a fourth cutout portion (not shown) formed at positions corresponding to the first cutout and the second cutout of the first side wall portion 16, respectively. The third cutout portion and the fourth cutout portion are each formed in a U-shaped cross section facing upward in the vertical direction. That is, the first through hole 22 through which the first wire harness 6 is inserted is formed by the first cutout portion and the third cutout portion. A second through hole 23 through which the second wire harness 7 is inserted is formed by the second cutout portion and the fourth cutout portion. Note that the through holes 22 and 23** are examples of the insertion holes in the embodiment of the present disclosure.

The first gasket 24 and the second gasket 25 are attached to the first through hole 22 and the second through hole 23, respectively. The first gasket 24 and the second gasket 25 are examples of the water cut-off member in the embodiment of the present disclosure. Each of the gaskets 24 and 25 seals the gap between the inner surface of the first through hole 22 and the first wire harness 6 and the gap between the inner surface of the second through hole 23 and the second wire harness 7 in a liquid-tight state.

Further, although not shown, the first side wall portion 16 and the second side wall portion 19 are fastened. For example, the first side wall portion 16 and the second side wall portion 19 are formed so as to overlap each other in the vertical direction, and the overlapping portions are fastened by bolts or the like. The first grommet 26 and the second grommet 27 are arranged so as to seal the gap formed in the overlapping portion. That is, each of the grommets 26 and 27 is provided to seal a gap in a fastening portion between the first side wall portion 16 and the second side wall portion 19. As a result, a space for accommodating the first connector 14 and the second connector 15 is formed by the undercover 8 and the upper cover 9. The space is sealed by the first side wall portion 16, the second side wall portion 19, the gaskets 24 and 25, and the grommets 26 and 27 so as to prevent moisture from entering from the outside.

On the lower surface **8*a* of the undercover 8, two second electric wire holding ribs 20 formed in a U-shaped cross section facing upward are formed. The two second electric wire holding ribs 20 are provided between the first through hole 22 and the first connector 14 in the horizontal direction in the undercover 8, and between the second through hole 23 and the second connector 15 in the horizontal direction in the undercover 8. Similarly to the first electric wire holding rib 17, the second electric wire holding rib 20 restricts the first wire harness 6 and the second wire harness 7 from moving downward or horizontally, respectively. The second electric wire holding rib 20 is formed at a position shifted in the horizontal direction with respect to the first electric wire holding rib 17. The second electric wire holding rib 20** is an example of another wire holding rib in the embodiment of the present disclosure.

Two connector holding ribs 21 for holding the first connector 14 and the second connector 15 are formed in the undercover 8. The connector holding rib 21 is formed in a U-shaped cross section facing upward in the vertical direction. The two connector holding ribs 21 respectively support the vicinity of the center in the horizontal direction of the connectors 14 and 15 from the lower side. Incidentally, the corresponding portion of each connector holding rib 21 of each connector is recessed is formed, it may be configured to restrict the positioning or movement in the horizontal direction by each connector holding rib 21 enters the recess.

The mounting structure 1 configured as described above is mounted on the vehicle 2 in a unitized state. For example, in a state in which the first connector 14 and the second connector 15 are connected, the connectors 14 and 15 are held by the connector holding ribs 21 of the undercover 8. Each of the wire harnesses 6 and 7 passes through the inside of the third cutout portion and the fourth cutout portion formed in the undercover 8, and is disposed in a state of being placed on each of the second electric wire holding ribs 20 formed in the undercover 8. Further, the first gasket 24 and the second gasket 25 are attached to each of the wire harnesses 6 and 7 in advance, and the first grommet 26 and the second grommet 27 are attached to the undercover 8 in advance. In this state, the upper cover 9 is placed over the undercover 8, and the upper cover is fastened by bolting or the like. After the undercover 8, the upper cover 9, and the wire harnesses 6 and 7 are unitized in this manner, the undercover 8 can be mounted on the vehicle 2 by attaching the undercover to the lower side of the floor panel 3 of the vehicle 2.

As described above, in the mounting structure 1 according to the embodiment of the present disclosure, two wire harnesses 6 and 7 are arranged between the floor panel 3 and the undercover 8. The first connector 14 and the second connector 15 are attached to the wire harnesses 6 and 7, respectively, and the first connector 14 and the second connector 15 are disposed in a state of being electrically connected to each other. An upper cover 9 is provided to cover the first connector 14 and the second connector 15. The upper cover 9 is fixed to the undercover 8, and the gap between the upper cover 9 and the undercover 8 is sealed by the gaskets 24 and 25 and the grommets 26 and 27. That is, the first connector 14 and the second connector 15 are held in a liquid-tight space formed by the upper cover 9 and the undercover 8. Therefore, it is possible to prevent or suppress the first connector 14 and the second connector 15 from being exposed to water.

In addition, the upper cover 9 and the undercover 8 are formed with through holes 22 and 23 through which the wire harnesses 6 and 7 pass. Further, the upper cover 9 and the undercover 8 are formed with electric wire holding ribs 17 and 20 and connector holding ribs 21 for holding the respective wire harnesses 6 and 7 and the respective connectors 14 and 15. In the mounting structure 1 according to the embodiment of the present disclosure, the respective wire harnesses 6 and 7 and the respective connectors 14 and 15 are held or positioned by the respective ribs 17, 20, and 21.

For example, in the case of holding each of the wire harnesses 6 and 7 on the lower side of the floor panel 3, it is necessary to form a bracket on the lower side of the floor panel 3, or to attach a clamp for bundling each of the wire harnesses 6 and 7. Further, each of the connectors 14 and 15 has a relatively large mass. Therefore, when attaching to the lower side of each connector 14, 15 floor panel 3, by fastening the bracket and the floor panel 3 by forming a bracket on each connector 14, 15, it is necessary to restrict the vertical and horizontal movement of each connector 14, 15.

In the mounting structure 1 according to the embodiment of the present disclosure, each of the ribs 17, 20, and 21 described above has all the functions thereof. That is, the respective wire harnesses 6 and 7 and the respective connectors 14 and 15 are held by the respective ribs 17, 20, and 21 formed in the undercover 8 and the upper cover 9. Further, the respective ribs 17, 20, and 21 restrict the vertical and horizontal movement of the respective wire harnesses 6 and 7 and the respective connectors 14 and 15. Therefore, the number of parts stores required for arranging the wire harnesses 6 and 7 and the connectors 14 and 15 can be reduced, and the size of the entire mounting structure 1 can be reduced. Further, since the respective ribs 17, 20, and 21 are formed, the strength of the undercover 8 and the upper cover 9 can be improved.

Furthermore, in the mounting structure 1 according to the embodiment of the present disclosure, each of the wire harnesses 6 and 7 and each of the connectors 14 and 15 can be wired only by attaching the undercover 8 to the lower side of the floor panel 3 by bolting or the like. That is, it is not necessary to hold the wire harnesses 6 and 7 in brackets formed on the floor panel 3, or to bolt the brackets of the connectors 14 and 15 to the lower side of the floor panel 3. Therefore, each of the wire harnesses 6 and 7 and each of the connectors 14 and 15 can be easily routed to the lower side of the floor panel 3. Further, since the connectors 14 and 15 are disposed in the space surrounded by the undercover 8 and the upper cover 9, interference with other peripheral devices can be avoided. Therefore, it is possible to increase the degree of freedom in arrangement of the wire harnesses 6 and 7.

Figure 3:
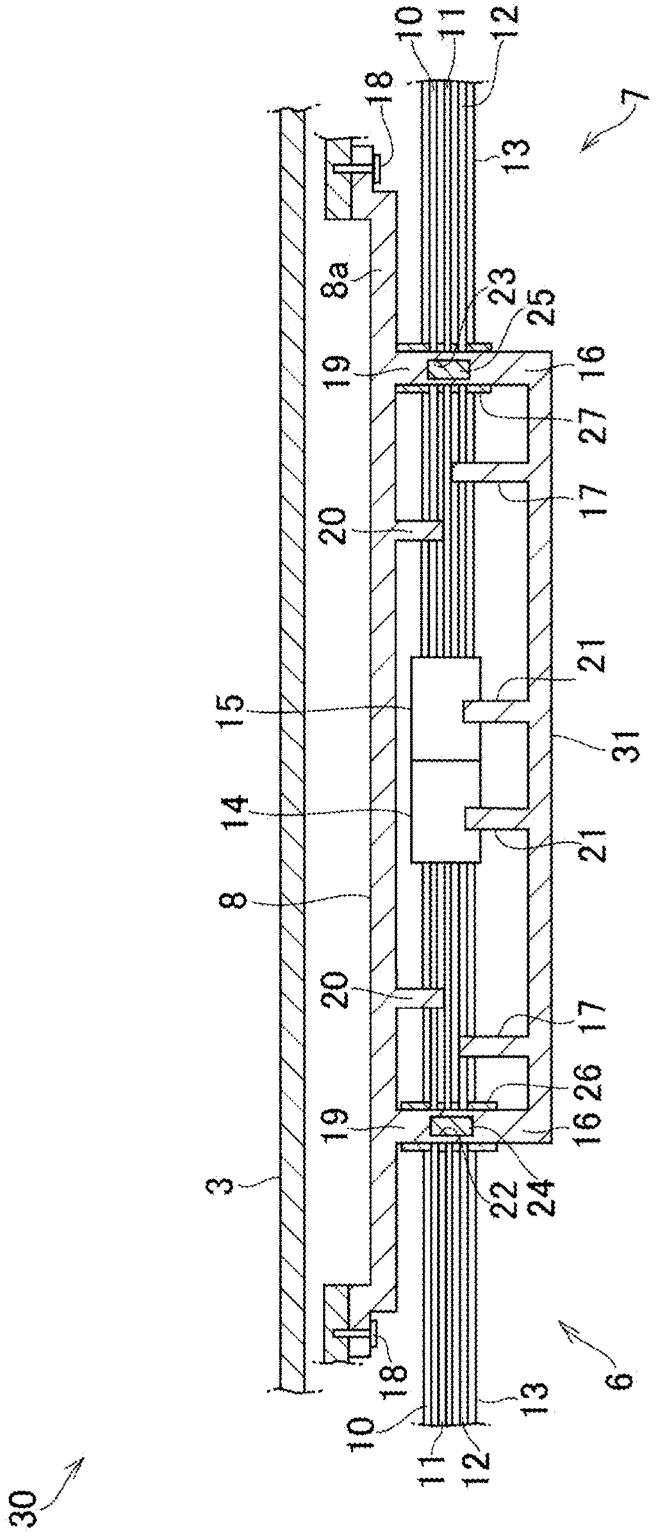
FIG. 3 is a cross-sectional view for explaining another example of the attachment structure of the electric wire in the embodiment of the present disclosure.

Next, another example of the mounting structure in the embodiment of the present disclosure will be described with reference to FIG. 3. In another mounting structure 30 shown in FIG. 3, the first wire harness 6 and the second wire harness 7 are wired under the undercover 8. A lower cover 31 is disposed to cover the first connector 14 and the second connector 15 from the lower side of each of the wire harnesses 6 and 7. In FIG. 3, only parts necessary for the description are denoted by reference numerals, and the same components as in FIG. 2 are denoted by the same reference numerals, and the description thereof is omitted or simplified.

As shown in FIG. 3, in the other mounting structure 30, the connectors 14 and 15 are covered from the lower side by the lower cover 31. Therefore, the undercover 8 functions as the upper cover 9 described above, and the lower cover 31 functions as the undercover 8 described above. Specifically, the above-described first side wall portion 16 and two first electric wire holding ribs 17 are formed on the lower surface of the undercover 8. The second side wall portion 19, the two second electric wire holding ribs 20, and the two connector holding ribs 21 are formed on the upper surface of the lower cover 31. Further, a first through hole 22 and a second through hole 23 through which the wire harnesses 6 and 7 are inserted are formed by respective notches (not shown)

formed in the first side wall portion 16 and the second side wall portion 19. Two grommets 26 and 27 for sealing the gap between the first side wall portion 16 and the second side wall portion 19, and two gaskets 24 and 25 for sealing the first through hole 22 and the second through hole 23, respectively, are provided. Even in the configuration as shown in FIG. 3, the same effects as those described above can be obtained. In the other mounting structure 30, even when the respective wire harnesses 6 and 7 cannot be arranged between the floor panel 3 and the undercover 8, the respective wire harnesses 6 and 7 can be arranged under the undercover 8 while ensuring the waterproofness of the respective connectors 14 and 15.

Although the embodiments of the present disclosure have been described above, the present disclosure is not limited to the above-described examples, and may be appropriately modified within the scope of achieving the object of the present disclosure. For example, in the above-described embodiment, the upper cover 9 and the lower cover 31 are formed in a rectangular shape, but the upper cover 9 and the lower cover 31 are not limited to a rectangular shape, and may be an oval shape or a dome shape. That is, it is sufficient that the periphery of each of the connectors 14 and 15 can be covered in a liquid-tight state. In the above-described embodiment, the upper cover 9, the lower cover 31, and the undercover 8 are provided with the first side wall portion 16 or the second side wall portion 19, respectively. Not limited to such a configuration, the side wall portion may be formed on only one of the upper cover 9, the lower cover 31, and the undercover 8. In this case, the through holes 22 and 23 may be formed in the side wall portion, and the through holes 22 and 23 may be configured to allow the wire harnesses 6 and 7 to pass therethrough and seal the gap with the gaskets 24 and 25.

What is claimed is:

1. An installation structure of electric wires, the installation structure comprising:

a floor panel that constitutes a floor surface in a cabin of a vehicle;

an undercover that is disposed with a predetermined interval on a lower side in a vertical direction of the floor panel;

a wire harness that is arranged with respect to the undercover and transmits electric power;

a connector that is attached to the wire harness to enable electrical connection and disconnection; and a cover member that is disposed to face the undercover in the vertical direction and is provided so as to cover the connector, wherein the cover member is fastened to the undercover such that an internal space in which the connector is housed is brought into a liquid-tight state.

2. The installation structure according to claim 1, wherein:

the cover member further includes an electric wire holding rib extending from a surface facing the vertical direction toward the undercover and supporting the wire harness;

the undercover further includes another electric wire holding rib extending from a surface facing the vertical direction toward the cover member and supporting the wire harness; and the undercover or the cover member further includes a connector holding rib extending upward in the vertical direction from the vertical direction and supporting the connector from below.

3. The installation structure according to claim 1, wherein:

a side wall extending in the vertical direction is provided in at least one of the cover member and the undercover; and an insertion hole through which the wire harness is inserted is provided in the side wall, and a water cut-off member that fills a gap between the wire harness and the insertion hole is attached to the insertion hole.

4. The installation structure according to claim 1, wherein the cover member is disposed between the floor panel and the undercover so as to cover the connector from above in the vertical direction.

5. The installation structure according to claim 1, wherein the cover member is disposed on a lower side of the undercover in the vertical direction so as to cover the connector from a lower side in the vertical direction.

* * * * *